(12) United States Patent
Garland et al.

(10) Patent No.: US 6,674,764 B1
(45) Date of Patent: Jan. 6, 2004

(54) COMMUNICATIONS SYSTEM AND METHOD WITH TELEMETRY DEVICE IDENTIFICATION CAPABILITIES

(75) Inventors: Stuart Mandel Garland, Morton Grove, IL (US); David B. Smith, Hinsdale, IL (US); Matthew Richard Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/256,802

(22) Filed: Feb. 24, 1999

(51) Int. Cl.[7] ............... H04L 12/14; H04M 11/00
(52) U.S. Cl. ............ 370/449; 379/106.01; 379/406.01
(58) Field of Search ................. 370/449, 450, 370/451, 346, 442; 379/382, 106.01, 22.04, 406.01, 416, 417, 106.08, 92.03

(56) References Cited

U.S. PATENT DOCUMENTS

| | | | | |
|---|---|---|---|---|
| 3,800,090 A | * | 3/1974 | Matena | 379/106.11 |
| 5,202,916 A | * | 4/1993 | Oliver | 379/106.04 |
| 5,204,896 A | * | 4/1993 | Oliver | 340/870.02 |
| 5,235,634 A | * | 8/1993 | Oliver | 379/106.06 |
| 5,488,654 A | * | 1/1996 | Oliver | 379/106.08 |
| 5,535,267 A | * | 7/1996 | Schull | 379/106.03 |
| 5,963,146 A | * | 10/1999 | Johnson et al. | 340/825.02 |
| 6,038,297 A | * | 3/2000 | Garland et al. | 379/106.01 |
| 6,173,323 B1 | * | 1/2001 | Moghe | 340/10.1 |

FOREIGN PATENT DOCUMENTS

| WO | WO 89/08959 | * | 9/1998 | ........... H04M/11/00 |

* cited by examiner

Primary Examiner—Hassan Kizou
Assistant Examiner—Ahmed Elallam

(57) ABSTRACT

A system and method for polling communication lines in a communication system having a plurality of communication lines and at least one telemetry device coupled to one of the plurality of communication lines. The method comprises the steps of creating a polling signal at the network switch, transmitting the polling signal from the network switch to one of the communication lines and determining whether the one communication line is associated with the telemetry device.

67 Claims, 2 Drawing Sheets

US 6,674,764 B1

COMMUNICATIONS SYSTEM AND METHOD WITH TELEMETRY DEVICE IDENTIFICATION CAPABILITIES

BACKGROUND OF THE INVENTION

This invention relates to communication systems and, more particularly, to telecommunication systems which provide telemetry services. Telecommunication systems employing telemetry applications are well known. Telemetry generally involves the transmission of data which represents status information concerning a remote device or function.

In order to perform telemetry applications, providers of telemetry services (such as a telephone company or third party service provider) are required to communicate with one or more telemetry devices such as telemetry interface units (TIUs), meter interface units (MIUs) or directly to the telemetry units without going through an interface or gateway.

Utility service providers, such as local electric power, natural gas, water providers, and information service providers are capable of accessing their telemetry units (such as usage meters or display devices) located at customer locations through the telecommunication lines for the customers via a suppressed ringing protocol, such as described in U.S. Pat. No. 5,189,694 issued Feb. 23, 1993 to Garland for "Telemetry Access Arrangement" and U.S. Pat. No. 5,509,054 issued Apr. 16, 1996 to Garland for "Communication Switching System." Both of these patents are hereby incorporated by reference with respect to such suppressed ringing and should also be referred to for general background on telephonic networks.

Suppressed ringing sets up a call path between a server and a telemetry device such as a TIU, MIU or a consumer premise equipment (CPE) via a public switched telephone network. The server first selectively sends a tone that alerts (wakes up) the telemetry device making it active (some go off hook to transmit data, others remain on hook to transmit data) without ringing the line connected to the telemetry device. The call path is not affected by the features on the line like call forwarding. Alternatively, a frequency shift keying (FSK) signal or a dual tone multiple frequency (DTMF) alert technique may be employed. Once the telemetry device is active, the server then communicates with the telemetry device. This allows for two way communication between the server and the telemetry device without sending a ring alert signal and distrubing (ringing) the consumers at-the location of the telemetry device or being effected by the features that the consumers may have enabled such as call forwarding, call blocking, automatic recall or other similar features.

Disadvantageously, in known systems, problems occur for telemetry service providers when telephone number changes are made by the end customers. Providers of telemetry services are not able to efficiently communicate with a telemetry device at a fixed location when telephone numbers are changed by a customer. Unfortunately, in this situation telemetry service providers cannot communicate with a telemetry interface (or gateway) due to the changing of directory number (DN) information associated with the premise and/or serving switch. The task of associating DNs to telemetry device location and serial number is commonly referred to as number administration.

At present, DN changes and unpublished DNs are tracked via the service order process and/or direct links to a non-switch database that records customer DNs and address, such as the E911 database. However, delays in database updates, additional interfaces, management of unpublished numbers, the proprietary nature of the service, and E911 databases render this type of tracking inefficient, inaccurate, expensive and never current.

SUMMARY OF THE INVENTION

The above problems are solved, and a number of technical advances are achieved in the art, by implementing a system and method for a communication system with telemetry device capabilities. The inventive system and method permits a telephone service provider to poll lines served by a switch including those which are flagged as having telemetry devices attached as customer premise equipment (CPE).

In accordance with the invention, a system for polling communication lines in a communication system having a plurality of communication lines and at least one telemetry device coupled to one of the plurality of communication lines is described. The system comprises a network switch that creates a polling signal and a network switch transmitter that transmits the polling signal from the network switch to one of the communication lines. A network switch receiver is utilized to receive a reply signal from the one communication line and a processor is employed to determine whether the one communication line is associated with the telemetry device in response to receipt of the reply signal. The processor additionally determines customer identification associated with the telemetry device.

Also in accordance with the invention, a method of polling communication lines in a communication system having a network switch, a plurality of communication lines and at least one telemetry device coupled to one of the plurality of communication lines is described. The method comprises the steps of creating a polling signal at the network switch, transmitting the polling signal from the network switch to one of the communication lines, receiving a reply signal from the one communication line and determining whether the one communication line is associated with the telemetry device in response to receipt of the reply signal. The method also includes the step of determining customer identification information associated with the telemetry device.

BRIEF DESCRIPTION OF THE DRAWINGS

The foregoing advantageous features of the invention will be described in detail and other advantageous features will be made apparent upon reading the following detailed description that is given with reference to the several figures of the drawings, in which.

DETAILED DESCRIPTION

Figure 1:
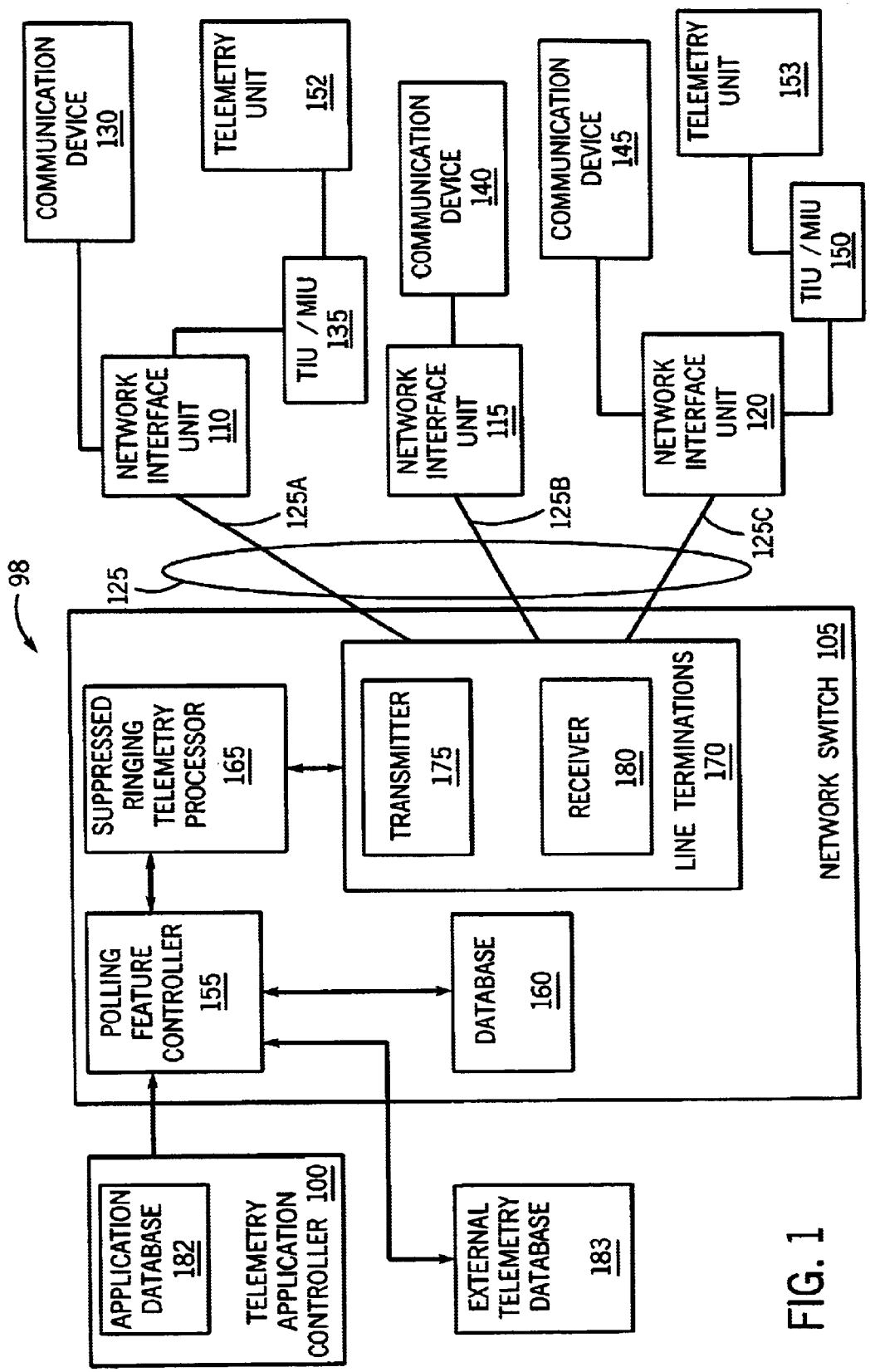
FIG. 1 shows a functional block diagram for the system of the invention with one central office switch.

FIG. 1 shows a block diagram for the communication system 98 having a telemetry application controller 100 in signal communication with a network switch 105. The network switch 105 is in signal communication with a plurality of network interface units 110, 115 and 120 via communication lines 125. Three network interface units 110, 115 and 120 and three communication lines 125A, 125B and 125C are shown for illustration purposes only as it will be appreciated that the present invention may selectively be performed with more or fewer network interface units and communication lines. Each network interface unit is in signal communication with a communication device and a telemetry interface unit (TIU also known as a meter interface unit—MIU), or a communication device only. The TIU is either a individual telemetry device or an interface unit that allows other telemetry units to communicate with the communication lines 125. Telemetry devices are communication devices that use telemetry signals to communicate with a central office switch. Examples of telemetry devices are TIUs, MIUs, and telemetry units such as telemetry enabled telephone equipment, computers, usage meters, alarms, sensors and display devices. It is appreciated that the telemetry device, TIU and communication device may selectively be different parts of the same component. As an example, a telemetry enabled telephone is both a communication device (it allows voice communication) and a telemetry device or TIU (it allows telemetry data communication) simultaneously.

Illustratively, network interface unit 110 is in signal communication with communication device 130 and TIU 135. Network interface unit 115 is in signal communication with communication device 140. And network interface unit 120 is in signal communication with communication device 145 and TIU 150. The network interface units bridge the equipment owned by the telephone service provider to the customer. Thus, each network interface unit is a demarcation point between the network of a telephone service provider and a customer.

TIU 135 is in signal communication with a telemetry unit 152 and TIU 150 is in signal communication with a telemetry unit 153. The telemetry units 152 and 153 are communication devices that receive and transmit telemetry information such as gateways, computers, advanced telemetry telephones and meters (gas, water and electric). Two telemetry units 152 and 153 are shown for illustration purposes only as it will be appreciated that the present invention may selectively be performed with more or fewer telemetry units. TIUs, MIUs and telemetry units are herein referred to as telemetry devices. Communication devices are any devices that allow voice communication, via the communication lines 125, to the network switch 105.

The network switch 105 contains a polling feature controller 155, a database 160, a suppressed ringing telemetry processor 165 and a line termination unit 170. The line termination unit 170 is an interface unit which interfaces the network switch 105 with the communication lines 125. The line termination unit 170 contains a network switch transmitter 175 and a network switch receiver 180 which transmit and receive communication signals to and from the communication lines 125.

The telemetry application controller 100 is preferably a computer system located at a telemetry service provider location. A telemetry service provider is a telephone company or third party service provider that renders service to an end customer (i.e. utility company, telephone company or homeowner) by providing a service based on device to device communication and data transfer such as a third party providing remote meter reading and billing service for a public utility company. It is appreciated that the telemetry application controller 100 may also selectively communicate with a telemetry device such as a telemetry enabled telephone in order to determine the parameters (telemetry functions) of the telemetry device. The telemetry application controller 100 preferably requests a polling of communication lines 125 by the network switch 105 and records the results in an application controller database 182.

The network switch 105 is preferably a telephonic switch located a central office such as a 5ESS®-2000 Switch manufactured by Lucent Technologies, Inc. Within the network switch 105, is the polling feature controller 155 which is a processor that controls the polling actions of the network switch 105. The polling feature controller 155 polls the communication lines 125 either in response to a request from the telemetry application controller 100 or, independent from the telemetry application controller 100, based on internal programmed parameters. It is appreciated that these internal programmed parameters may be selectively activated by internal software timers or triggers built or programmed into the network switch 105. As an example, a DN change would trigger one of these polling sequences.

The database 160 is a status database which may be selectively located at the network switch 105. It is appreciated that the status database 160 may also alternatively be placed at a remote location such as the application controller database 182 and an external telemetry database 183 without changing the procedure described. The database 160 records the results of the polling performed by the network switch 105 and keeps a record of the customer identification information such as associate directory number (DN) or office equipment (OE)/port information on the network switch 105 with the telemetry device(s) serial number, type, TCP/IP sub-addresses, special characteristics (such as processing capability from an onboard processor) service or communication parameters (such as text and messaging services), display type, read only device, data storage, transfer rate and maintenance data storage. The database 160 keeps an effective, accurate and current tracking of customer DNs versus telemetry devices and device type and capability.

The polling feature controller 155 polls the communication lines 125 based on a polling rule or command, caused by a DN change, that is preferably provided by the telemetry application controller 100 or the internal software. The polling rule may selectively operate in an update or verification mode. In the update mode, the polling rule requires that the network switch 105 poll the communication lines 125 that have been marked (tagged because DNs cannot be reached) for polling by either the telemetry application controller 100 or the polling feature controller 155 in combination with the database 160. In the verification mode, the network switch 105 polls all the communication lines 125 and compares the results to the stored values in the database 160.

Additionally, a group polling rule may also selectively be employed by the telemetry application controller 100 or the internal software. A group polling rule selectively polls groups of communication lines 125 for DN changes.

The suppressed ringing telemetry processor 165 is a processor that controls the suppressed ringing features of the network switch 105. The suppressed ringing telemetry processor 165 may selectively be a independent processor on the network switch 105 or part of the switch processor of the network switch 105 as in the 5ESS®-2000 Switch. The suppressed ringing telemetry processor 165 sets up a call path between the network switch 105 and a telemetry device or communication device such as a consumer premise equipment (CPE). The suppressed ringing telemetry processor 165 first sends a polling signal, a single frequency or combination thereof, such as a single of dual tone, a dual tone multiple frequency (DTMF) or a frequency shift keying (FSK) signal, that alerts (wakes up or makes active) the telemetry device without ringing the line connected to the telemetry device. Alternatively, a universal alert signal technique. may be employed. Once the telemetry device is active, the network switch 105 then communicates with the telemetry device. This allows for two way communication between the network switch 105 and the telemetry device without disturbing (ringing) the consumers at the location of the telemetry device or being effected by the features that the consumers may have enabled such as call forwarding, call blocking, automatic recall or other similar features.

The universal alert signal is an alert signal (polling signal) that alerts (makes active) any telemetry devices connected to the network switch 105 via the communication lines 125. The universal alert signal as a universal key and allows a telephonic service provider to communicate with any telemetry devices connected to the network switch 105 without the need to provide password information to the telemetry devices or transmit a specific signal type such as single or dual tone, DTMF or FSK. In response to the universal alert signal, the telemetry devices provide the network switch 105 with non-sensitive information about the telemetry device such as serial number, device type, etc. but not the data itself. It is appreciated that the network switch 105 connects one call at a time through the network switch 105 processor, but several at a time due to to the parallelism in the telemetry devices and communication devices.

In response to a polling action by the polling feature controller 155, the suppressed ringing telemetry processor 165 sends a polling signal (preferably a 480 Hertz tone, however numerous single and dual frequency tones, DTMF, FSK or service provider agreed signal format signals may also be selectively employed), to the communication line. If a telemetry device is present and connected to the communication line the telemetry device will go to an off hook condition in response to the tone within a specified time such as less than one second. As a result of going to an off hook condition the impedance of the telemetry device changes and the new impedance of the telemetry device is detected by the network switch 105 via changes in detected currents or voltages. A reply signal is then transmitted from the telemetry device through the TIU and network interface unit to the receiver 180 of the network switch 105. It is appreciated that numerous telemetry devices will also communicate with the network switch 105 while still in a on hook (non off hook) condition. These telemetry devices (such as a telemetry enabled telephones) employ circuitry that allows communication with the network switch 105 while still in an on hook state (condition).

In response to the reply signal, the polling feature controller 155 will determine that a telemetry device (such as TIU 135, TIU 150, telemetry unit 152 and telemetry unit 153) is connected to the communication line. the polling feature controller 155 determines that a telemetry device is connected to the network interface because the reply signal is a known alert signal or command, via a single tone, dual tone, FSK, or DTMF signal, that triggers the polling feature controller 155. The reply signal may selectively be the reflected polling signal in response to the change in impedance value of the telemetry device. The polling feature controller 155 records the DN corresponding to the communication line and instructs the suppressed ringing telemetry processor 165 to communicate with the telemetry device and obtains the information associated with any telemetry unit or units connected to the TIU.

Alternatively, if there is no TIU or other telemetry device associated with a network interface unit the network switch 105 will have a time out condition because there is no off hook, or on hook response, at the network switch 105 within the specified time. Alternatively, if there is no response to the first tone, the network switch 105 may selectively cycle through the other tones, DTMF and FSK signals. If there is still no response after the cycle is complete the network switch 105 times out. In response to the time out condition, the polling feature controller 155 determines that there is no telemetry device (such as TIU 135, TIU 150, telemetry unit 152 and telemetry unit 153) associated to the polled communication line and network interface unit. The polling feature controller 155 then records the information in the database 160 and polls the next communication line.

The network switch 105 preferably places polling calls in parallel while processing other calls based on network switch 105 resource load. If the network switch 105 is idle, numerous polling calls may selectively be made at the same time. A real time check at the network switch 105 will determine the polling speed of the network switch 105. It is appreciated that the network switch 105 is capable of placing many simultaneous polling calls and may selectively cycle though all the communication lines 125 in a limited time. The polling feature controller 155 determines the polling ratio by first looking at the network switch 105 resource utilization. Low resource utilization may selectively permit many simultaneous polling calls.

The network switch 105 also supervises the types of calls processed by the network switch 105. When a incoming or out going call is present on a communication line, the network switch 105 will terminate the polling call on that corresponding communication line.

Illustrative of the operation of the communication system 98 polling the communication lines 125A, 125B and 125C, the polling feature controller 155 preferably begins a polling procedure based on an outside request from the telemetry application controller 100 or on internal software logic. The polling feature controller 155 instructs the suppressed ringing telemetry processor 165 to send a polling signal via transmitter 175 to communication line 125A. When the communication line 125A receives the polling signal, the communication line 125A forwards it to the TIU 135 which routs (and selectively interfaces with) the polling signal to telemetry unit 152. The TIU 135 responds by going to an off hook condition and changing its impedance value within a specified time (for illustration purposes assumed to be less than one second). Alternatively, the telemetry unit 152 may also selectively go off hook in response to the polling signal. As a result, communication line 125A responds to the receiver 180 with a reply signal preferably within one second. In response to the reply signal, the polling feature controller 155 determines that communication line 125A has TIU 135 and telemetry unit 152 attached to it because the reply signal may selectively contain a serial number or other identifying information for the TIU 135 or telemetry unit 152. The pollin feature controller 155 instructs the suppressed ringing telemetry processor 165 to communicate with TIU 135 and telemetry unit 152 and obtain any serial number, class type, device status, TCP/IP sub-addresses, special characteristics, service parameters, display type, read only device, data storage, transfer rate, and maintenance data. The polling feature controller 155 then records, in the database 160 (or database 183), the communication line 125A DN or OE/port information with the corresponding information from the TIU 135 and telemetry unit 152.

Next, the polling feature controller 155 instructs the suppressed ringing telemetry processor 165 to send the polling signal via transmitter 175 to communication line 125B and to communication device 140 (through network interface unit 115). When the communication line 125B receives the polling signal there is no telemetry device to respond thus there is no reply signal to respond within one second and the polling procedure for communication line 125B times out. In response to the time out condition, the polling feature controller 155 determines that communication line 125B does not have a telemetry device attached and polling feature controller 155 records, in the database 160 (or database 183), the communication line 125B DN or OE/port information with a note that there is no telemetry device attached. The procedure for polling communication line 125C is the same as communication line 125A.

Figure 2:
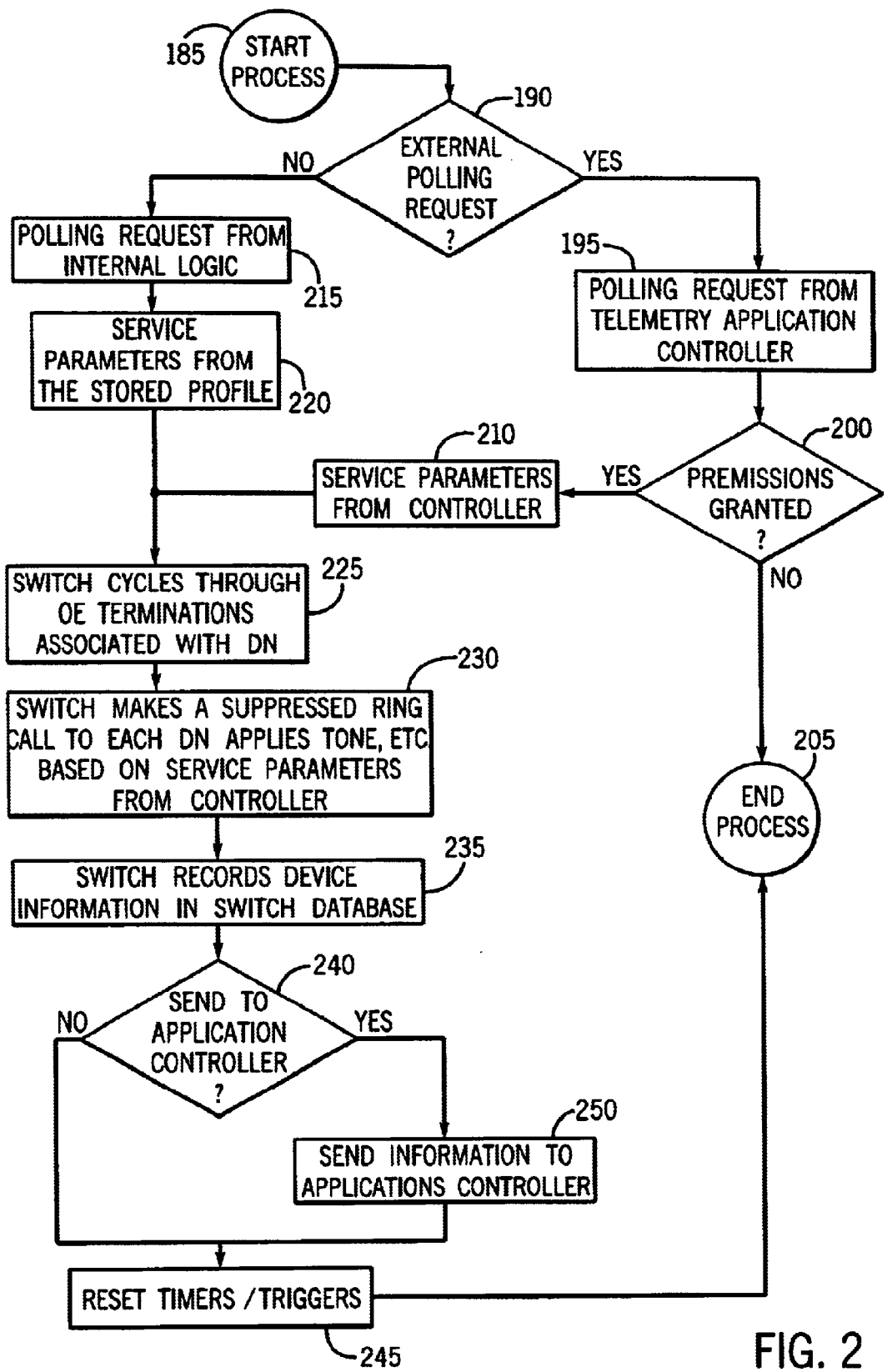
FIG. 2 is a logical flow diagram showing the process performed by the system of FIG. 1.

FIG. 2 is a logical flow diagram for the process performed by the system of FIG. 1. The process starts when the network switch 105 is triggered to poll the communication lines 125 in step 185. In decision step 190, if the poll triggering is a result of an external polling request from the telemetry application controller 100, the process continues to step 195. In step 195 the polling feature controller 155 receives the polling request from the telemetry application controller 100. The polling feature controller 155, in decision step 200, then determines if the telemetry application controller 100 has permission to make the request. If the answer is NO, the polling feature controller 155 denies permission to the telemetry application controller 100 and the process ends in step 205.

If instead, the answer to decision step 200 is YES, the process continues to step 210. In step 210, the polling feature controller 155 receives the service parameters from the telemetry application controller 100 and continues to step 225. It is appreciated that if the request is made by a telemetry service provider, the telemetry service provider will have permission to look for telemetry devices it owns or controls because the provider preferably identifies who it is and what telemetry devices it is looking to poll. The polling feature controller 155 selectively filters the CPE data to permit sending data that belongs to the service provider. If the network switch 105 is polling to update data records in database 160 or 183, filtering is not required. Polling rules may also include number of simultaneous calls made, how long should polling take. Polling rules may also request communication lines that have changed to be polled. i.e. look to communication lines tagged by a recent change/verification process.

If instead, the answer to decision step 190 is NO, the process continues to step 215. In step 215, the polling feature controller 155 receives the polling request from the internal software in the network switch 105 software. In step 220, the polling feature controller 155 receives the service parameters from the internal software and continues to step 225. Internal polls are used to update the status database 160 (or database 183). Internal polling marks calls for complete polling, selective polling, random polling and speed of polling.

In step 225, the network switch begins to cycle (poll) through the OE terminations associated with each DN. Polling is based on OE number blocks, or load balancing algorithms within the switch based on call processing load. In step 230, the suppressed ringing telemetry processor 165 then places a suppressed ringing call to each DN, associated with the OE/port, based the polling rule from either the service parameters from the telemetry application controller 100 or the service parameters from the internal software of the polling feature controller 155. The suppressed ringing call electrical characteristics contain an electrical signal (referred to as a polling signal) that is preferably at a single tone, dual tone, universal tone, DTMF, or FSK signal that is known not to interface with call processing, that travels through the transmitter 175 to the communication lines 125.

In response to the polling signal, the communication lines 125 and any corresponding connected TIUs, telemetry units or other telemetry devices respond by returning a reply signal containing device information (such as identification number, device type, service function parameters) and customer identification numbers to the receiver 180. In step 235, the network switch 105 records the telemetry device information and the customer identification numbers on the network switch 105 status database 160 (or database 182) and the process continues to decision step 240. In decision step 240, the polling feature controller 155 determines, based on whether the polling request was from the telemetry application controller 100 in decision step 190, whether to send the device information and the customer identification numbers to the telemetry application controller 100. If the answer is NO, the process continues to step 245 where the network switch 105 resets itself (including resetting timers and triggers) and the process ends in step 205.

If instead the answer to decision step 240 is YES, the process continues step 250. In step 250, the polling feature controller 155 sends the device information to the telemetry application controller 100 and the process continues to step 245 where the network switch 105 resets itself (including resetting timers and triggers) and the process ends in step 205.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed:

1. A method of polling communication lines in a communication system having a central office telephonic switch, a plurality of communication lines and at least one telemetry device coupled to one of the plurality of communication lines comprising the steps of:

establishing a polling rule that is supported by a status database located at the central office telephone switch;

creating a polling signal at the central office telephonic switch according to the polling rule;

transmitting the polling signal from the central office telephonic switch to one of the communication lines;

determining whether the one communication line is associated with the telemetry device; and determining that the communication line is not associated with a telemetry device in response to a time out condition;

wherein the status database keeps a record of associate directory numbers and office equipment/port information on the central office telephonic switch with the TIU device serial number, type, sub-addresses, special characteristics, service parameters, display type, read only, data storage, transfer rate and maintenance data; and wherein the step of determining that the communication line is not associated with a telemetry device further includes determining that the telemetry device is not in an off hook condition within a specified time.

2. The method of claim 1 wherein the polling rule is supported by a telemetry application controller remote from the central office telephonic switch.

3. A system for polling communication lines in a communication system having a plurality of communication lines and at least one telemetry device coupled to one of the plurality of network interface units comprising:

a central office telephonic switch that creates a polling signal;

a central office telephonic switch transmitter that transmits the polling signal from the central office telephonic switch to one of the communication lines; and a processor that determines whether the one communication line is associated with the telemetry device;

wherein the central office telephonic switch establishes a polling rule for polling the communication lines;

wherein the polling rule is implemented by a status database located at the central office telephonic switch; and wherein the status database keeps a record of associate directory numbers and office equipment/port information on the central office telephonic switch with the TIU device serial number, type, sub-addresses, special characteristics, service parameters, display type, read only, data storage, transfer rate and maintenance data.

4. A system for polling communication lines in a communication system having a plurality of communication lines and at least one telemetry device coupled to one of the plurality of network interface units comprising:

a central office telephonic switch that creates a polling signal;

a central office telephonic switch transmitter that transmits the polling signal from the central office telephonic switch to one of the communication lines; and a processor that determines whether the one communication line is associated with the telemetry device;

wherein the central office telephonic switch establishes a polling rule for polling the communication lines;

wherein the polling rule is implemented by a status database located external to the central office telephonic switch; and wherein the status database keeps a record of associate directory numbers and office equipment/port information of the central office telephonic switch with the TIU device serial number, type, sub-addresses, special characteristics, service parameters, display type, read only, data storage, transfer rate and maintenance data.

5. A method of polling communication lines in a communication system having a central office telephonic switch, a plurality of communication lines and at least one telemetry device coupled to one of the plurality of communication lines comprising the steps of:

establishing a polling rule that is supported by a status database located at the central office telephone switch;

creating a polling signal at the central office telephonic switch according to the polling rule;

transmitting the polling signal from the central office telephonic switch to one of the communication lines;

determining whether the one communication line is associated with the telemetry device; and determining that the communication line is not associated with a telemetry device in response to a time out condition;

wherein the status database keeps a record of associate directory numbers and office equipment/port information on the central office telephonic switch; and wherein the step of determining that the communication line is not associated with a telemetry device further includes determining that the telemetry device is not in an off hook condition within a specified time.

6. The method of claim 5 wherein each record kept in the status database includes a TIU device serial number.

7. The method of claim 6 wherein each record kept in the status database includes a type.

8. The method of claim 7 wherein each record kept in the status database includes a sub-address.

9. The method of claim 8 wherein each record kept in the status database includes a special characteristic.

10. The method of claim 8 wherein each record kept in the status database includes a service parameter.

11. The method of claim 8 wherein each record kept in the status database includes a transfer rate, a display type, a read only status, data storage and maintenance data.

12. The method of claim 9 wherein each record kept in the status database includes a service parameter.

13. The method of claim 9 wherein each record kept in the status database includes a transfer rate, a display type, a read only status, data storage and maintenance data.

14. The method of claim 10 wherein each record kept in the status database includes a transfer rate, a display type, a read only status, data storage and maintenance data.

15. The method of claim 7 wherein each record kept in the status database includes a special characteristic.

16. The method of claim 15 wherein each record kept in the status database includes a service parameter.

17. The method of claim 15 wherein each record kept in the status database includes a transfer rate, a display type, a read only status, data storage and maintenance data.

18. The method of claim 16 wherein each record kept in the status database includes a transfer rate, a display type, a read only status, data storage and maintenance data.

19. The method of claim 7 wherein each record kept in the status database includes a service parameter.

20. The method of claim 19 wherein each record kept in the status database includes a transfer rate, a display type, a read only status, data storage and maintenance data.

21. The method of claim 7 wherein each record kept in the status database includes a transfer rate, a display type, a read only status, data storage and maintenance data.

22. The method of claim 6 wherein each record kept in the status database includes a sub-address.

23. The method of claim 22 wherein each record kept in the status database includes a special characteristic.

24. The method of claim 22 wherein each record kept in the status database includes a service parameter.

25. The method of claim 22 wherein each record kept in the status database includes a transfer rate, a display type, a read only status, data storage and maintenance data.

26. The method of claim 23 wherein each record kept in the status database includes a service parameter.

27. The method of claim 23 wherein each record kept in the status database includes a transfer rate, a display type, a read only status, data storage and maintenance data.

28. The method of claim 26 wherein each record kept in the status database includes a transfer rate, a display type, a read only status, data storage and maintenance data.

29. The method of claim 24 wherein each record kept in the status database includes a transfer rate, a display type, a read only status, data storage and maintenance data.

30. The method of claim 6 wherein each record kept in the status database includes a special characteristic.

31. The method of claim 30 wherein each record kept in the status database includes a service parameter.

32. The method of claim 31 wherein each record kept in the status database includes a transfer rate, a display type, a read only status, data storage and maintenance data.

33. The method of claim 30 wherein each record kept in the status database includes a transfer rate, a display type, a read only status, data storage and maintenance data.

34. The method of claim 6 wherein each record kept in the status database includes a service parameter.

35. The method of claim 34 wherein each record kept in the status database includes a transfer rate, a display type, a read only status, data storage and maintenance data.

36. The method of claim 6 wherein each record kept in the status database includes a transfer rate, a display type, a read only status, data storage and maintenance data.

37. The method of claim 5 wherein each record kept in the status database includes a type.

38. The method of claim 37 wherein each record kept in the status database includes a sub-address.

39. The method of claim 38 wherein each record kept in the status database includes a special characteristic.

40. The method of claim 39 wherein each record kept in the status database includes a service parameter.

41. The method of claim 40 wherein each record kept in the status database includes a transfer rate.

42. The method of claim 39 wherein each record kept in the status database includes a transfer rate, a display type, a read only status, data storage and maintenance data.

43. The method of claim 38 wherein each record kept in the status database includes a service parameter.

44. The method of claim 43 wherein each record kept in the status database includes a transfer rate, a display type, a read only status, data storage and maintenance data.

45. The method of claim 38 wherein each record kept in the status database includes a transfer rate, a display type, a read only status, data storage and maintenance data.

46. The method of claim 37 wherein each record kept in the status database includes a special characteristic.

47. The method of claim 46 wherein each record kept in the status database includes a service parameter.

48. The method of claim 47 wherein each record kept in the status database includes a transfer rate, a display type, a read only status, data storage and maintenance data.

49. The method of claim 46 wherein each record kept in the status database includes a transfer rate, a display type, a read only status data storage and maintenance data.

50. The method of claim 37 wherein each record kept in the status database includes a service parameter.

51. The method of claim 50 wherein each record kept in the status database includes a transfer rate, a display type, a read only status, data storage and maintenance data.

52. The method of claim 37 wherein each record kept in the status database includes a transfer rate, a display type, a read only status, data storage and maintenance data.

53. The method of claim 5 wherein each record kept in the status database includes a sub-address.

54. The method of claim 53 wherein each record kept in the status database includes a special characteristic.

55. The method of claim 54 wherein each record kept in the status database includes a service parameter.

56. The method of claim 55 wherein each record kept in the status database includes a transfer rate, a display type, a read only status, data storage and maintenance data.

57. The method of claim 54 wherein each record kept in the status database includes a transfer rate, a display type, a read only status, data storage and maintenance data.

58. The method of claim 53 wherein each record kept in the status database includes a service parameter.

59. The method of claim 58 wherein each record kept in the status database includes a transfer rate, a display type, a read only status, data storage and maintenance data.

60. The method of claim 53 wherein each record kept in the status database includes a transfer rate, a display type, a read only status, data storage and maintenance data.

61. The method of claim 5 wherein each record kept in the status database includes a special characteristic.

62. The method of claim 61 wherein each record kept in the status database includes a service parameter.

63. The method of claim 62 wherein each record kept in the status database includes a transfer rate, a display type, a read only status, data storage and maintenance data.

64. The method of claim 61 wherein each record kept in the status database includes a transfer rate, a display type, a read only status, data storage and maintenance data.

65. The method of claim 5 wherein each record kept in the status database includes a service parameter.

66. The method of claim 5 wherein each record kept in the status database includes a transfer rate, a display type, a read only status, data storage and maintenance data.

67. The method of claim 65 wherein each record kept in the status database includes a transfer rate, a display type, a read only status, data storage and maintenance data.

* * * * *